F. MECKEL.
LUBRICATOR.
APPLICATION FILED MAY 11, 1918. RENEWED APR. 8, 1921.
1,379,199. Patented May 24, 1921.
2 SHEETS—SHEET 1.
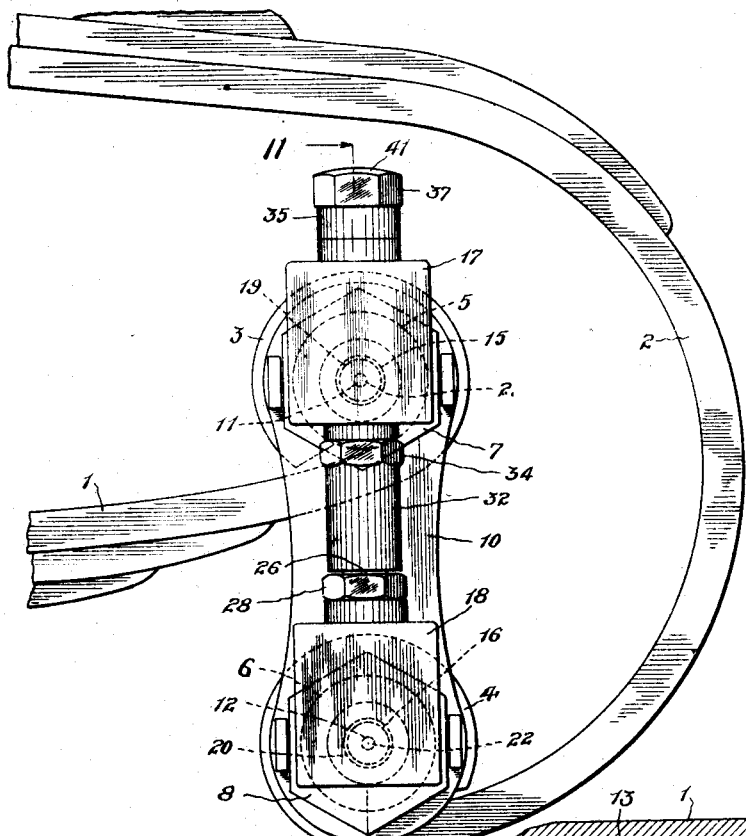
Fig. I.
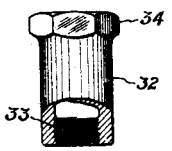
Fig. IV.
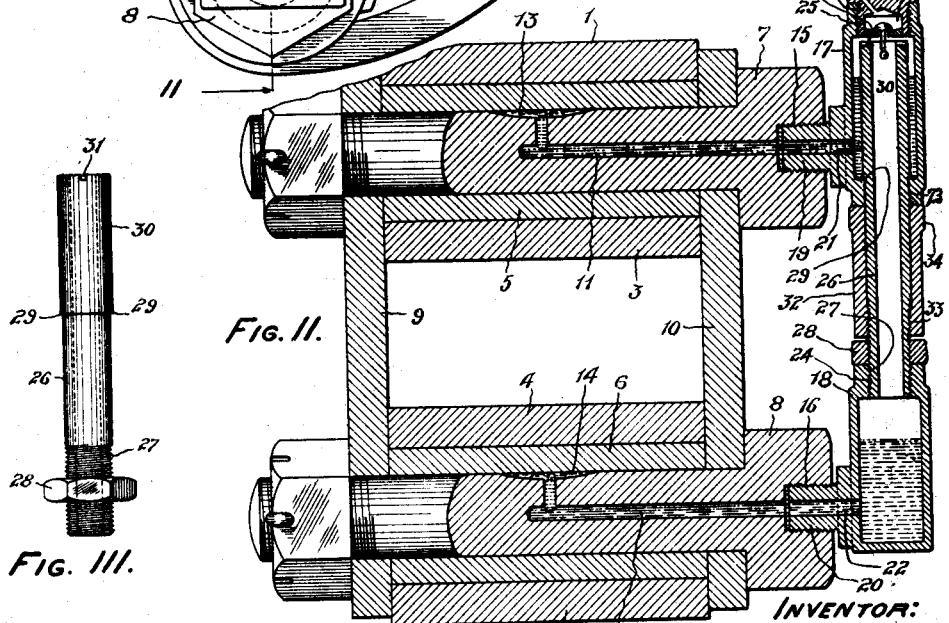
Fig. II.
Fig. III.
INVENTOR:
Frank Meckel
BY HIS ATTY F. MECKEL.
LUBRICATOR.
APPLICATION FILED MAY 11, 1918. RENEWED APR. 8, 1921.
1,379,199.
Patented May 24, 1921.
2 SHEETS—SHEET 2.
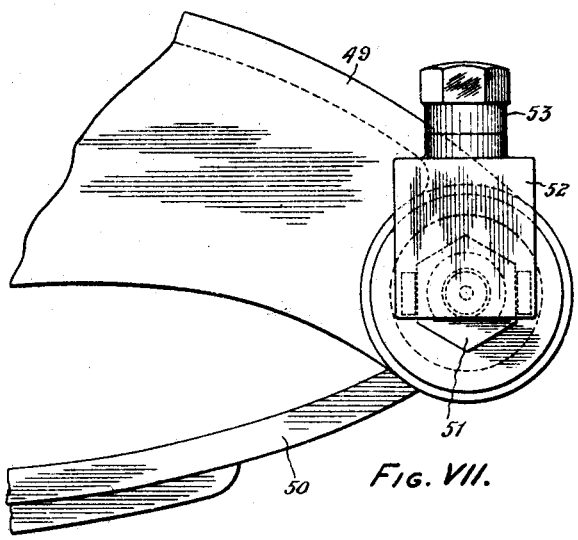
Fig. VII.
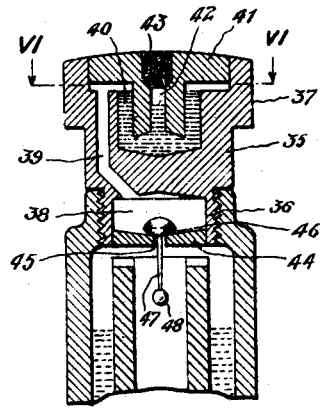
Fig. V.
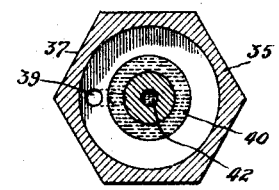
Fig. VI.
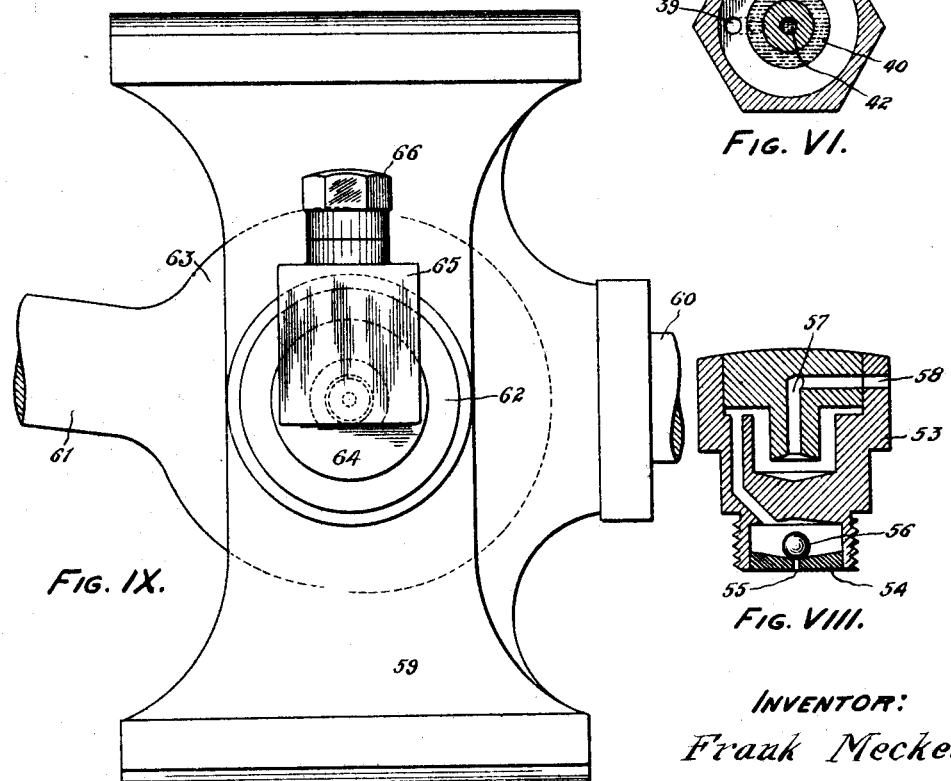
Fig. IX.
Fig. VIII.
INVENTOR:
Frank Meckel
BY HIS ATT'Y

UNITED STATES PATENT OFFICE.

FRANK MECKEL, OF LAKEWOOD, OHIO.

LUBRICATOR.

1,379,199.  Specification of Letters Patent.  Patented May 24, 1921.

Application filed May 11, 1918, Serial No. 233,822. Renewed April 8, 1921. Serial No. 459,712.

*To all whom it may concern:*

Be it known that I, FRANK MECKEL, a citizen of the United States, residing at 1507 Grace Ave., city of Lakewood, in the county of Cuyahoga and State of Ohio, have invented a new and useful Improvement in Lubricators, of which the following is a specification, the principle of the invention being herein explained, and the best mode in which I have contemplated applying that principle, so as to distinguish it from other inventions.

This invention pertains to a lubricator and more particularly to a device associated therewith for automatically controlling the discharge of fluid oils both in quantity and as to frequency.

Fluid oil lubrication has advantages over grease lubrication in that it may be more uniformly and more continuously supplied when needed. On the other hand the use of fluid oil heretofore entailed waste unless means were provided for collecting the surplus oil and cleaning it preparatory to reuse. Fluid oil tends to exude to the bearing which it is purposed to supply even when not required as, for example, when the parts are stationary, and this tendency is especially manifest in the presence of heat owing to the viscosity of the oil becoming lessened. Many parts in automobile structures which require lubrication, notably the points of spring suspension, obviously do not permit of provision for retaining any waste oil. This is, moreover, equally true of many other conceivable mechanisms having surfaces where friction ensues.

Accordingly, the object of my invention is to automatically prescribe the amount of oil and likewise regulate the frequency with which a given amount is supplied to a bearing or other friction surface which is subject to bodily movement or vibration. In practising my invention, after the manner exemplified in the drawings, I have utilized the physical law whereby fluid may be held in a container provided below with a comparatively small opening but without communication with the atmosphere above the level of the fluid owing to the atmospheric pressure resisting the tendency to establish a vacuum above the surface of the fluid. I do provide a vent, but compel a relief to atmospheric conditions along what is in the nature of a zig-zag route and accomplish this by immersing a portion of the vent duct in a separate substantially unchanging supply of fluid elevated with respect to the main reservoir. The arrangement is such that the escape of oil from the reservoir is normally substantially prevented, but coincident with the occurrence of any movement at the friction surface with which the outlet from the reservoir communicates, a small measure of oil is withdrawn by capillary attraction so that a slight rarefication of air occurs above the main reservoir supply. Such rarefication of air becomes more marked until the equation of pressures is reëstablished to an equilibrium by the passage of one or more air bubbles through the auxiliary fluid supply above, whereupon the operation is repeated. It will be perceived therefore that there is an alternate occurrence of a comparative rarefication of air and reëstablishment of atmospheric conditions above the oil supply in the main reservoir consequent upon the intermittent pulling of small measures of oil from the constricted outlet of the main reservoir.

Inasmuch as all parts having friction surfaces to be lubricated are nevertheless subject to wear and therefore eventual looseness and unevenness of fit I have thought it well to provide an additional absolute check upon or prevention of any outflow of oil from the reservoir when the parts are quiet.

Adverting to the drawings:

Figure I is a side elevation of a pair of spring ends movably connected together by means of a lubricator embodying my invention.

Fig. II is a section on line II—II of Fig. I with certain portions removed.

Figs. III and IV are elevations of details.

Fig. V is an enlarged section of the regulating cap with which this invention is associated.

Fig. VI is a section on line VI—VI of Fig. V looking downwardly.

Fig. VII is a broken side elevation of a modified application of my invention.

Fig. VIII is an enlarged section of a modified form of reservoir cap.

Fig. IX illustrates another modified adaptation of my invention.

In Figs. I to VI inclusive, I have illustrated my invention in conjunction with a structure embodying the invention shown, described and claimed in United States Letters Patent No. 1,239,203 issued to my son, F. A. Meckel, on September 4th, 1917. The structural arrangement disclosed in such patent has met with pronounced commercial favor, but is improved by being supplied with a regulating cap according to the disclosure of this application.

A pair of spring ends 1 and 2 are fashioned to their extremities with scrolls 3 and 4 respectively in which bushings 5 and 6 are seated. Extending through these bushings are a pair of bolts 7 and 8. These bolts are adapted to secure a pair of hangers 9 and 10 in place upon opposite ends of the scrolls so as to effect a movable action therebetween in a manner well known to the art. The bolts 7 and 8 are furthermore fashioned with right angled ducts 11 and 12 opening at one end through the heads of the bolts and at their other ends terminating in suitable grooves 13 and 14 opposed to the bushings 5 and 6. The ducts 11 and 12 communicate through in the heads of the bolts with enlarged tapped openings 15 and 16. The lubricator is composed of a pair of superposed reservoirs 17 and 18 having complementarily threaded projections 19 and 20 adapted to be fitted into the openings 15 and 16. These projections are fashioned with ducts 21 and 22 affording communication between the reservoirs 17 and 18 and the ducts 11 and 12 respectively. The bottom of the upper reservoir 17 is provided with a plain opening 23 and the top of the lower reservoir 18 is provided with a screw threaded opening 24. The top of the upper reservoir 17 is likewise provided with a screw threaded opening 25. Rigidly connecting the reservoirs is a hollow stem 26 having its lower extremity screw threaded at 27 and adapted to have threaded connection with the opening 24 in the lower reservoir. A locknut 28 is provided for the usual purpose. The stem 26 is formed with a shoulder 29 adapted to rest upon the interior edge of the opening 23 in the bottom of the upper reservoir so as to maintain the projection of the upper portion 30 of the stem a predetermined distance upwardly in the upper reservoir as is well shown in Fig. II. The purpose of this arrangement is to make the supply of oil in the upper reservoir independent of the draining of the lower reservoir. The top edge of the stem 26 is provided with diametrically opposite slots 31 to permit the insertion of a screw driver to enable the proper positioning of the stem 26 preparatory to locking it by binding the locknut 28 against the upper surface of the lower reservoir. A locking ferrule 32 is provided with a female screw thread 33 adapted to engage the threads 27 and be adjusted therealong by effecting a turning movement of the unit formation 34 at the top of the ferrule. It will be observed that a telescopic communication is afforded between the upper and lower reservoirs such that while the latter are enabled to move toward and away from each other, the lubricator, in its entirety, serves to stiffen the hanger connection and to resist lateral vibration and distortion.

The invention which features this application is confined to the construction of the cap 35 which has its lower end 36 screw fitted into the opening 25 in the top of the upper reservoir and its upper end 37 of hexagonal formation as appears in Fig. 2. The cap 35 is hollowed in a peculiar manner and its design is best shown in Fig. V where it is noticed to comprise a lower compartment 38 from which a small passage 39 extends upwardly to communicate with the top of a chamber 40 purposed to contain a fluid as shown in Figs. II, V and VI, which in practice may be the same oil with which the reservoir 17 and 18 are filled. Depending into the chamber 40 from the top 41 of the cap is an air duct 42 adapted to serve as a vent or breathing hole. The outer end of the duct 42 is slightly enlarged to serve as a pocket for a loose packing of felt 43 in order to exclude the entry of grit and dust. Extending across the bottom of the compartment 38 is a partition 44 provided with a small central opening 45 adapted to be closed by what is in the nature of a gravity or pendulum valve including a spherical surface top 46 above the partition 44, a pendulum 47 loosely extending through the opening 45 and a weighted ball 48 carried by the lower end of the pendulum 47.

*Operation.*

Assuming that the springs 1 and 2 constitute a part of an automobile, it is clear that when the latter is stationary the valve 46 will close the opening 45 and prevent the escape of any oil from the ducts 11 and 12 owing to the resistance furnished by the tendency to establish a vacuum upon the surface of the oil in the reservoirs 17 and 18. However, as soon as the lubricator, in its entirety, is set in motion from whatever cause so that a frictional engagement is created between the bushings 5 and 6 and the bolts 7 and 8 the pendulum 47 will be rocked or swung from side to side so as to intermittently afford atmospheric communication through the opening 45. Thereupon globules of oil are permitted to escape to and from the grooves 13 and 14. In order, however, to still further control conditions and regulate the escape of oil to the wearing surfaces, both in quantity and as to frequency I have provided a check valve to relieve the establishment of a partial vacuum. When the lubricator, as a whole, is at rest the outflow of oil is likewise resisted by the maintenance of a sufficient partial vacuum. Whenever vibration occurs a gravitational flow of oil ensues but only when the equation of pressures is so unbalanced as to enable atmospheric pressure to force one or more air bubbles through the fluid in the chamber 40, the path of such bubbles being downwardly through the fluid in the duct 42 and then upwardly through the fluid in the chamber 40. The speed of flow of the oil is influenced and determined by the size of the breathing hole, by the size of the outlet at the wearing surface, by the action of the valve, by the viscosity of the oil itself and by the resistance depending upon the closeness of fit at the bushing to be lubricated. The vibrations of the automobile shake loose the drops of oil that tend to flow out of the reservoir and each drop which so escapes increases the partial vacuum above the reservoirs until such condition is relieved by the entrance of air in the form of bubbles.

The modification disclosed in Fig. VII involves not only a single friction surface connection but in consequence a single reservoir. According to this form the lubricator is shown applied to the connection between the rear extremity 49 of an automobile frame and a single spring 50. These parts are connected by a bolt 51 corresponding in design to either of the bolts 7 and 8 and carrying in its head a single reservoir 52 supplied with a cap 53 embodying the slight modifications which appear in the sectional view of Fig. VIII. It will be noticed that the bottom 54 of the cap is similarly provided with a depressed upper or interior surface converging to a central aperture 55 adapted normally to be closed by a ball 56. A further modification consists in having the vent duct 57 open through the side of the cap at 58 so that there is less likelihood of an entry of solid particles even without the insertion of a porous packing.

Fig. IX illustrates a crosshead 59 connected on one side with a piston rod 60 and on the other side with a connecting rod 61 having a pivotal connection therewith at 62. The end 63 of the connecting rod may be forked and secured in place by a bolt 64 and communicating therethrough in the manner earlier explained is a single reservoir 65 provided with a cap 66 designed according to my invention.

It will be observed that when the lubricator is quite full and the cap is screwed down, the oil rises and completely fills the cap, indeed exudes out of the breathing hole thus forcing out any dirt in the cap and automatically cleaning the hole.

I claim:

1. An article subject to bodily movement or vibration in the manner described for regulating the escape of fluid, comprising a hollow structure having a storage reservoir and a fluid valve chamber and a passage communicating with each, said structure being further provided with an inlet and an outlet, said structure also formed with a duct open at one end to the atmosphere and having its other end lower than the upper end of said passage whereby to form a fluid seal valve.

2. An article subject to bodily movement or vibration in the manner described for regulating the escape of fluid, comprising a hollow structure having a pair of superposed chambers and a passage affording communication between the upper ends of said chambers, the lower of said chambers being provided with a fluid outlet, the upper of said chambers being provided with an air duct communicating therewith at a point lower than the upper end of said passage whereby to form a fluid seal valve.

3. A lubricator subject to bodily movement or vibration comprising an oil receptacle formed with a pair of superposed chambers, a constricted passage between the tops of said chambers, a breathing duct leading to a point in said upper chamber below the upper end of said passage and in communication with the atmosphere whereby to form a fluid seal valve, and an outlet opening in the lower of said chambers.

4. A lubricator subject to bodily movement or vibration comprising a hollow structure including an oil reservoir provided with an inlet and an outlet opening, and a device for automatically controlling the escape of oil from said outlet opening in response to alternate comparative rarefication of air and reëstablishment of atmospheric conditions in said reservoir, said device comprising a fluid seal valve formed by a fluid containing chamber supported above and having its upper portion in communication with said reservoir, said chamber being intersected by a breathing duct leading upwardly to the atmosphere.

5. An article subject to bodily movement or vibration for regulating the escape of fluid, comprising a pair of fluid reservoirs each provided with an opening, said openings being juxtapositioned, one of said reservoirs being provided interiorly with partitions projecting in opposite directions past each other, other openings in said reservoirs respectively communicating on the remote sides of said partitions respectively, said partitions forming in conjunction with the fluid thereabout a fluid seal valve.

6. A lubricator subject to bodily movement or vibration comprising a reservoir having an outlet below and a passage leading upwardly therefrom, a chamber in communication with the upper end of said passage adapted to contain a fluid, and a duct open above to the atmosphere through said chamber and having its lower end projecting below the surface of the fluid in said chamber.

7. A lubricator subject to bodily movement or vibration comprising a hollow structure including an oil reservoir having an outlet below, said reservoir being provided above with a zig-zag vent, said structure also formed with an auxiliary chamber adapted to be supplied with a fluid for normally obstructing such vent.

8. A lubricator subject to bodily movement or vibration comprising a hollow structure including an oil reservoir having an outlet below, said reservoir being provided with an upwardly extending open passage, said structure also formed with an auxiliary chamber below the top of said passage and purposed to contain a fluid, said structure being additionally formed with a duct open above to the atmosphere and with its lower end immersed in the fluid contained in said chamber.

9. A lubricator subject to bodily movement or vibration comprising a reservoir provided with an upper inlet and a lower outlet, a hollow cap structure closing said inlet and fashioned interiorly with a zig-zag passage open to the atmosphere to serve as a vent, said structure having a hollow portion constituting a part of said zig-zag passage and adapted to contain a distinct fluid supply.

10. A lubricator subject to bodily movement or vibration comprising a hollow structure including an oil reservoir provided with an inlet and an outlet opening, and a device covering said inlet opening and adapted to make and break atmospheric communication therethrough whereby to automatically control the escape of oil from said outlet opening in response to alternate comparative rarefication of air and reëstablishment of atmospheric conditions in said reservoir.

11. A lubricator subject to bodily movement or vibration comprising a reservoir provided with an inlet and an outlet opening, a hollow closure fitted to said inlet opening and formed with a chamber containing a fluid, said cap being fashioned with a divided vent affording communication between said reservoir and the atmosphere through said fluid.

12. A lubricator subject to bodily movement or vibration comprising a reservoir provided with an upper inlet and a lower outlet opening, a hollow closure fitted to said inlet opening and formed with a chamber containing a fluid, said cap being fashioned with a divided vent affording communication between the top of said reservoir and the atmosphere through said fluid, different parts of said vent terminating above and below the level of said fluid respectively.

13. A lubricator subject to bodily movement or vibration comprising a reservoir provided with an upper inlet and a lower outlet opening, a hollow closure fitted to said inlet opening and formed with a chamber containing a fluid, said cap being fashioned with a passage leading from said reservoir to a point above the level of said fluid, said cap also fashioned with a duct dipping into said fluid and extending above the upper end of said passage, said duct also having open communication with the atmosphere.

14. An article subject to bodily movement or vibration in the manner described comprising, a reservoir provided above with a vent opening, and a gravity actuated valve at said opening.

15. An article subject to bodily movement or vibration in the manner described comprising, a reservoir provided above with an inlet, a cap carried over said inlet and itself provided with an opening, and a member adapted to cover and uncover said opening in response to bodily movement of said reservoir.

16. A lubricator subject to bodily movement or vibration comprising, a reservoir provided above with an inlet, a cap removably carried over said inlet and a bottom converging to a vent opening, and a member fitted to said opening and adapted to open or close the same in response to vibration of the parts.

17. A lubricator subject to bodily movement or vibration comprising, a reservoir provided above with an inlet, a hollow cap carried over said inlet and itself provided with a vent, the bottom of said cap being provided with a round aperture adapted to communicate with said inlet, and a pendulum suspended in said aperture and having a spherical surface adapted to rest over the same.

18. A lubricator subject to bodily movement or vibration comprising a reservoir provided with an upper inlet and a lower outlet, a hollow cap structure closing said inlet and fashioned interiorly with a zig-zag passage open to the atmosphere to serve as a vent, said structure having a hollow portion constituting a part of said zig-zag passage and adapted to contain a distinct fluid supply, the bottom of said structure being provided with an aperture affording communication to said reservoir, and a gravity actuated valve for normally closing said aperture.

19. A lubricator subject to bodily movement or vibration comprising a reservoir provided with an inlet and an outlet opening, a hollow closure fitted to said inlet opening and formed with a chamber containing a fluid, said closure being fashioned with a divided vent affording communication between said reservoir and the atmosphere through said fluid, the bottom of said structure being provided with an aperture affording communication to said reservoir, and a gravity actuated valve for normally closing said aperture.

20. A lubricator subject to bodily movement or vibration comprising a reservoir provided with an upper inlet and a lower outlet opening, a hollow closure fitted to said inlet opening and formed with a chamber containing a fluid, said closure being fashioned with a passage leading from said reservoir to a point above the level of said fluid, said cap also fashioned with a duct dipping into said fluid and extending above the upper end of said passage, said duct also having open communication with the atmosphere, the bottom of said closure being provided with an aperture affording communication to said reservoir, and a gravity actuated valve for normally closing said aperture.

21. A lubricator subject to bodily movement or vibration comprising a reservoir provided with an upper inlet and a lower outlet opening, a hollow closure fitted to said inlet opening and formed with a chamber containing a fluid, said closure being fashioned with a divided vent affording communication between the top of said reservoir and the atmosphere through said fluid, different parts of said vent terminating above and below the level of said fluid respectively, said closure being provided below with an aperture affording communication to said reservoir, and a valve structure adapted gravitationally to cover said aperture and to uncover the same in response to bodily movement of said reservoir.

22. An article of the character described subject to bodily movement or vibration comprising a reservoir provided below with a fluid discharge opening and above with an air vent opening, and a vibratorily displaceable valve at said air vent opening and adapted alternatively to be seated whereby to limit the discharge of fluid when the parts are quiescent and to be unseated so as to restore atmospheric equilibrium when the parts are vibrant.

23. An article of the character described subject to bodily movement or vibration comprising a reservoir provided above with a vent opening, a displaceable valve for said opening, and a fluid seal valve additionally controlling said vent action subject to the movement of said displaceable valve to its open position.

Signed by me, this 22nd day of April, 1918.

FRANK MECKEL.